(12) United States Patent
Vykunta et al.

(10) Patent No.: US 12,399,984 B1
(45) Date of Patent: Aug. 26, 2025

(54) SYSTEM, METHOD, AND COMPUTER PROGRAM FOR PREDICTIVE AUTOSCALING FOR FASTER SEARCHES OF EVENT LOGS IN A CYBERSECURITY SYSTEM

(71) Applicant: Exabeam, Inc., Foster City, CA (US)

(72) Inventors: Venkateswara Rao Vykunta, Fremont, CA (US); Dinesh Maheshwari, San Ramon, CA (US)

(73) Assignee: Exabeam, Inc., Foster City, CA (US)

( * ) Notice: Subject to any disclaimer, the term of this patent is extended or adjusted under 35 U.S.C. 154(b) by 167 days.

(21) Appl. No.: 18/209,427

(22) Filed: Jun. 13, 2023

(51) Int. Cl.
  *G06F 21/55* (2013.01)
  *H04L 9/40* (2022.01)

(52) U.S. Cl.
  CPC .......... *G06F 21/552* (2013.01); *G06F 21/554* (2013.01); *G06F 2221/034* (2013.01); *H04L 63/1416* (2013.01)

(58) Field of Classification Search
  CPC .................. G06F 21/552; G06F 2221/034
  See application file for complete search history.

(56) References Cited

U.S. PATENT DOCUMENTS

| | | | |
|---|---|---|---|
| 5,941,947 A | 8/1999 | Brown et al. | |
| 6,223,985 B1 | 5/2001 | DeLude | |
| 6,594,481 B1 | 7/2003 | Johnson et al. | |
| 7,181,768 B1 | 2/2007 | Ghosh et al. | |
| 7,624,277 B1 | 11/2009 | Simard et al. | |
| 7,668,776 B1 | 2/2010 | Ahles | |
| 8,326,788 B2 | 12/2012 | Allen et al. | |
| 8,443,443 B2 | 5/2013 | Nordstrom et al. | |
| 8,479,302 B1 | 7/2013 | Lin | |
| 8,484,230 B2 | 7/2013 | Harnett et al. | |
| 8,539,088 B2 | 9/2013 | Zheng | |
| 8,583,781 B2 | 11/2013 | Raleigh | |
| 8,606,913 B2 | 12/2013 | Lin | |
| 8,676,273 B1 | 3/2014 | Fujisake | |
| 8,850,570 B1 | 9/2014 | Ramzan | |

(Continued)

OTHER PUBLICATIONS

Bahnsen, Alejandro Correa "Classifying Phishing URLs Using Recurrent Neural Networks", IEEE 2017, 8 pages.

(Continued)

*Primary Examiner* — Hadi S Armouche
(74) *Attorney, Agent, or Firm* — Lessani Law Group, PC

(57) ABSTRACT

The present disclosure describes a system, method, and computer program for predictive autoscaling for faster searches of event logs in a cybersecurity system. In one embodiment, the system receives search-related signals from a plurality of signal sources. The signals are indicative of: (1) a user's intent to perform a search for event logs in a cybersecurity database, (2) how computationally intensive the potential search is likely to be, and (3) the currently available computational resources. The signals are evaluated, and an autoscale prediction score is calculated. The autoscale prediction score reflects the likelihood of a user to submit search, the computational resources required for the potential search, and the currently available computational resources. The system scales computational resources in accordance with the autoscale prediction score. These steps are performed before any search is submitted by the user in a search user interface.

21 Claims, 3 Drawing Sheets

(56) References Cited

U.S. PATENT DOCUMENTS

| | | |
|---|---|---|
| 8,881,289 B2 | 11/2014 | Basavapatna et al. |
| 9,055,093 B2 | 6/2015 | Borders |
| 9,081,958 B2 | 7/2015 | Ramzan et al. |
| 9,129,110 B1 | 9/2015 | Mason et al. |
| 9,185,095 B1 | 11/2015 | Moritz et al. |
| 9,189,623 B1 | 11/2015 | Lin et al. |
| 9,202,052 B1 | 12/2015 | Fang et al. |
| 9,680,938 B1 | 6/2017 | Gil et al. |
| 9,690,938 B1 | 6/2017 | Saxe et al. |
| 9,692,765 B2 | 6/2017 | Choi et al. |
| 9,760,240 B2 | 9/2017 | Maheshwari et al. |
| 9,779,253 B2 | 10/2017 | Mahaffey et al. |
| 9,798,883 B1 | 10/2017 | Gil et al. |
| 9,832,138 B1* | 11/2017 | Skalski .................. G06F 9/5083 |
| 9,843,596 B1 | 12/2017 | Averbuch et al. |
| 9,898,604 B2 | 2/2018 | Fang et al. |
| 10,063,582 B1 | 8/2018 | Feng et al. |
| 10,095,871 B2 | 10/2018 | Gil et al. |
| 10,178,108 B1 | 1/2019 | Lin et al. |
| 10,354,015 B2 | 7/2019 | Kalchbrenner et al. |
| 10,360,387 B2 | 7/2019 | Jou et al. |
| 10,397,272 B1 | 8/2019 | Bruss et al. |
| 10,419,470 B1 | 9/2019 | Segev et al. |
| 10,445,311 B1 | 10/2019 | Saurabh et al. |
| 10,467,631 B2 | 11/2019 | Dhurandhar et al. |
| 10,474,828 B2 | 11/2019 | Gil et al. |
| 10,496,815 B1 | 12/2019 | Steiman et al. |
| 10,621,343 B1 | 4/2020 | Maciejak et al. |
| 10,645,109 B1 | 5/2020 | Lin et al. |
| 10,685,293 B1 | 6/2020 | Heimann et al. |
| 10,803,183 B2 | 10/2020 | Gil et al. |
| 10,819,724 B2 | 10/2020 | Amiri et al. |
| 10,841,338 B1 | 11/2020 | Lin et al. |
| 10,887,325 B1 | 1/2021 | Lin et al. |
| 10,944,777 B2 | 3/2021 | Lin et al. |
| 11,017,173 B1 | 5/2021 | Lu et al. |
| 11,080,483 B1 | 8/2021 | Islam et al. |
| 11,080,591 B2 | 8/2021 | van den Oord et al. |
| 11,128,600 B2 | 9/2021 | Bansal et al. |
| 11,140,167 B1 | 10/2021 | Lin et al. |
| 11,151,471 B2 | 10/2021 | Niininen et al. |
| 11,178,168 B1 | 11/2021 | Lin et al. |
| 11,245,716 B2 | 2/2022 | Roelofs et al. |
| 11,423,143 B1 | 8/2022 | Lin et al. |
| 11,431,741 B1 | 8/2022 | Lin et al. |
| 11,463,331 B1 | 10/2022 | Arlitt et al. |
| 11,625,366 B1 | 4/2023 | Steiman et al. |
| 11,736,527 B1 | 8/2023 | Durairaj et al. |
| 11,843,505 B1* | 12/2023 | Cruise .................. G06F 16/953 |
| 11,956,253 B1 | 4/2024 | Lin et al. |
| 12,034,732 B2 | 7/2024 | Lin et al. |
| 12,063,226 B1 | 8/2024 | Lin et al. |
| 12,164,402 B1* | 12/2024 | Xie .................. G06F 11/3006 |
| 2002/0107926 A1 | 8/2002 | Lee |
| 2003/0065926 A1 | 4/2003 | Schultz et al. |
| 2003/0147512 A1 | 8/2003 | Abburi |
| 2004/0073569 A1 | 4/2004 | Knott et al. |
| 2006/0090198 A1 | 4/2006 | Aaron |
| 2007/0156771 A1 | 7/2007 | Hurley et al. |
| 2007/0282778 A1 | 12/2007 | Chan et al. |
| 2008/0028467 A1 | 1/2008 | Kommareddy et al. |
| 2008/0040802 A1 | 2/2008 | Pierson et al. |
| 2008/0170690 A1 | 7/2008 | Tysowski |
| 2008/0262990 A1 | 10/2008 | Kapoor et al. |
| 2008/0301780 A1 | 12/2008 | Ellison et al. |
| 2009/0144095 A1 | 6/2009 | Shahi et al. |
| 2009/0171752 A1 | 7/2009 | Galvin et al. |
| 2009/0292954 A1 | 11/2009 | Jiang et al. |
| 2009/0293121 A1 | 11/2009 | Bigus et al. |
| 2010/0125911 A1 | 5/2010 | Bhaskaran |
| 2010/0191763 A1 | 7/2010 | Wu |
| 2010/0269175 A1 | 10/2010 | Stolfo et al. |
| 2010/0284282 A1 | 11/2010 | Golic |
| 2011/0167495 A1 | 7/2011 | Antonakakis et al. |
| 2012/0278021 A1 | 11/2012 | Lin et al. |
| 2012/0316835 A1 | 12/2012 | Maeda et al. |
| 2012/0316981 A1 | 12/2012 | Hoover et al. |
| 2013/0080631 A1 | 3/2013 | Lin |
| 2013/0086273 A1* | 4/2013 | Wray .................. G06F 9/5072 709/226 |
| 2013/0117554 A1 | 5/2013 | Ylonen |
| 2013/0197998 A1 | 8/2013 | Buhrmann et al. |
| 2013/0227643 A1 | 8/2013 | Mccoog et al. |
| 2013/0268260 A1 | 10/2013 | Lundberg et al. |
| 2013/0305357 A1 | 11/2013 | Ayyagari et al. |
| 2013/0340028 A1 | 12/2013 | Rajagopal et al. |
| 2014/0007238 A1 | 1/2014 | Magee |
| 2014/0090058 A1 | 3/2014 | Ward et al. |
| 2014/0101759 A1 | 4/2014 | Antonakakis et al. |
| 2014/0315519 A1 | 10/2014 | Nielsen |
| 2014/0365418 A1 | 12/2014 | Grant |
| 2015/0026027 A1 | 1/2015 | Priess et al. |
| 2015/0039543 A1 | 2/2015 | Athmanathan et al. |
| 2015/0046969 A1 | 2/2015 | Abuelsaad et al. |
| 2015/0100558 A1 | 4/2015 | Fan |
| 2015/0121503 A1 | 4/2015 | Xiong |
| 2015/0205944 A1 | 7/2015 | Turgeman |
| 2015/0215325 A1 | 7/2015 | Ogawa |
| 2015/0339477 A1 | 11/2015 | Abrams et al. |
| 2015/0341379 A1 | 11/2015 | Lefebvre et al. |
| 2015/0363691 A1 | 12/2015 | Gocek et al. |
| 2016/0005044 A1 | 1/2016 | Moss et al. |
| 2016/0021117 A1 | 1/2016 | Harmon et al. |
| 2016/0063397 A1 | 3/2016 | Ylipaavalniemi et al. |
| 2016/0292592 A1 | 10/2016 | Patthak et al. |
| 2016/0306965 A1 | 10/2016 | Iyer et al. |
| 2016/0364427 A1 | 12/2016 | Wedgeworth, III |
| 2017/0019506 A1 | 1/2017 | Lee et al. |
| 2017/0024135 A1 | 1/2017 | Christodorescu et al. |
| 2017/0127016 A1 | 5/2017 | Yu et al. |
| 2017/0155652 A1 | 6/2017 | Most et al. |
| 2017/0161451 A1 | 6/2017 | Weinstein et al. |
| 2017/0178026 A1 | 6/2017 | Thomas et al. |
| 2017/0213025 A1 | 7/2017 | Srivastav et al. |
| 2017/0223035 A1* | 8/2017 | Watanabe ........... H04L 41/0896 |
| 2017/0236081 A1 | 8/2017 | Grady Smith et al. |
| 2017/0264679 A1 | 9/2017 | Chen et al. |
| 2017/0318034 A1 | 11/2017 | Holland et al. |
| 2017/0322959 A1* | 11/2017 | Tidwell .................. G06F 21/554 |
| 2017/0323636 A1 | 11/2017 | Xiao et al. |
| 2018/0004961 A1 | 1/2018 | Gil et al. |
| 2018/0039699 A1* | 2/2018 | Wan .................. G06F 16/3322 |
| 2018/0048530 A1 | 2/2018 | Nikitaki et al. |
| 2018/0063168 A1 | 3/2018 | Sofka |
| 2018/0069893 A1 | 3/2018 | Amit et al. |
| 2018/0075343 A1 | 3/2018 | van den Oord et al. |
| 2018/0089304 A1 | 3/2018 | Vizer et al. |
| 2018/0097822 A1 | 4/2018 | Huang et al. |
| 2018/0144139 A1 | 5/2018 | Cheng et al. |
| 2018/0157963 A1 | 6/2018 | Salti et al. |
| 2018/0165554 A1 | 6/2018 | Zhang et al. |
| 2018/0181883 A1 | 6/2018 | Ikeda |
| 2018/0190203 A1 | 7/2018 | Cui et al. |
| 2018/0234443 A1 | 8/2018 | Wolkov et al. |
| 2018/0248895 A1 | 8/2018 | Watson et al. |
| 2018/0285340 A1 | 10/2018 | Murphy et al. |
| 2018/0288063 A1 | 10/2018 | Koottayi et al. |
| 2018/0288086 A1 | 10/2018 | Amiri et al. |
| 2018/0307994 A1 | 10/2018 | Cheng et al. |
| 2018/0316701 A1 | 11/2018 | Holzhauer et al. |
| 2018/0322368 A1 | 11/2018 | Zhang et al. |
| 2019/0014149 A1 | 1/2019 | Cleveland et al. |
| 2019/0028496 A1 | 1/2019 | Fenoglio et al. |
| 2019/0034641 A1 | 1/2019 | Gil et al. |
| 2019/0066185 A1 | 2/2019 | More et al. |
| 2019/0080225 A1 | 3/2019 | Agarwal |
| 2019/0081957 A1 | 3/2019 | Thrash et al. |
| 2019/0089721 A1 | 3/2019 | Pereira et al. |
| 2019/0103091 A1 | 4/2019 | Chen |
| 2019/0114419 A1 | 4/2019 | Chistyakov et al. |
| 2019/0122078 A1* | 4/2019 | Ura .................. G06N 20/20 |
| 2019/0124045 A1 | 4/2019 | Zong et al. |
| 2019/0124093 A1 | 4/2019 | Sharma et al. |
| 2019/0132629 A1 | 5/2019 | Kendrick |

(56) References Cited

U.S. PATENT DOCUMENTS

| | | | |
|---|---|---|---|
| 2019/0149565 | A1 | 5/2019 | Hagi et al. |
| 2019/0171655 | A1 | 6/2019 | Psota et al. |
| 2019/0173804 | A1* | 6/2019 | Nicas ............... H04L 47/822 |
| 2019/0182280 | A1 | 6/2019 | La Marca et al. |
| 2019/0205750 | A1 | 7/2019 | Zheng et al. |
| 2019/0207969 | A1 | 7/2019 | Brown |
| 2019/0213247 | A1 | 7/2019 | Pala et al. |
| 2019/0244603 | A1 | 8/2019 | Angkititrakul et al. |
| 2019/0303703 | A1 | 10/2019 | Kumar et al. |
| 2019/0318100 | A1 | 10/2019 | Bhatia et al. |
| 2019/0334784 | A1 | 10/2019 | Kvernvik et al. |
| 2019/0349400 | A1 | 11/2019 | Bruss et al. |
| 2019/0378051 | A1 | 12/2019 | Widmann et al. |
| 2019/0384762 | A1* | 12/2019 | Hill ............... G06F 16/2272 |
| 2020/0021607 | A1 | 1/2020 | Muddu et al. |
| 2020/0021620 | A1 | 1/2020 | Purathepparambil et al. |
| 2020/0034481 | A1* | 1/2020 | Asplund ............... G06F 16/35 |
| 2020/0082098 | A1 | 3/2020 | Gil et al. |
| 2020/0137104 | A1 | 4/2020 | Hassanzadeh et al. |
| 2020/0177618 | A1 | 6/2020 | Hassanzadeh et al. |
| 2020/0228557 | A1 | 7/2020 | Lin et al. |
| 2020/0302118 | A1 | 9/2020 | Cheng et al. |
| 2020/0327886 | A1 | 10/2020 | Shalaby et al. |
| 2021/0081459 | A1* | 3/2021 | Chung ............... H04L 51/224 |
| 2021/0089884 | A1 | 3/2021 | Macready et al. |
| 2021/0125050 | A1 | 4/2021 | Wang |
| 2021/0126938 | A1 | 4/2021 | Trost et al. |
| 2021/0133331 | A1 | 5/2021 | Lipkis et al. |
| 2021/0182612 | A1 | 6/2021 | Zeng et al. |
| 2021/0232768 | A1 | 7/2021 | Ling et al. |
| 2021/0248240 | A1 | 8/2021 | Comish et al. |
| 2022/0006814 | A1 | 1/2022 | Lin et al. |
| 2022/0030017 | A1 | 1/2022 | Infante-Lopez et al. |
| 2022/0076164 | A1* | 3/2022 | Conort ............... G06N 20/00 |
| 2022/0147622 | A1 | 5/2022 | Chesla |
| 2022/0245093 | A1* | 8/2022 | Batsakis ............... G06F 16/144 |

OTHER PUBLICATIONS

Chen, Jinghui, et al., "Outlier Detection with Autoencoder Ensembles", Proceedings of the 2017 SIAM International Conference on Data Mining, pp. 90-98.

Cooley, R., et al., "Web Mining: Information and Pattern Discovery on the World Wide Web", Proceedings Ninth IEEE International Conference on Tools with Artificial Intelligence, Nov. 3-8, 1997, pp. 558-567.

DatumBox Blog, "Machine Learning Tutorial: The Naïve Bayes Text Classifier", DatumBox Machine Learning Blog and Software Development News, Jan. 2014, pp. 1-11.

Fargo, Farah "Resilient Cloud Computing and Services", PhD Thesis, Department of Electrical and Computer Engineering, University of Arizona, 2015, pp. 1-115.

Freeman, David, et al., "Who are you? A Statistical Approach to Measuring User Authenticity", NDSS, Feb. 2016, pp. 1-15.

Goh, Jonathan et al., "Anomaly Detection in Cyber Physical Systems using Recurrent Neural Networks", IEEE 2017, pp. 140-145.

Guo, Diansheng et al., "Detecting Non-personal and Spam Users on Geo-tagged Twitter Network", Transactions in GIS, 2014, pp. 370-384.

Ioannidis, Yannis, "The History of Histograms (abridged)", Proceedings of the 29th VLDB Conference (2003), pp. 1-12.

Kim, Jihyun et al., "Long Short Term Memory Recurrent Neural Network Classifier for Intrusion Detection", IEEE 2016, 5 pages.

Malik, Hassan, et al., "Automatic Training Data Cleaning for Text Classification", 11th IEEE International Conference on Data Mining Workshops, 2011, pp. 442-449.

Mietten, Markus et al., "ConXsense-Automated Context Classification for Context-Aware Access Control", Asia CCS'14, 2014, pp. 293-304.

Poh, Norman, et al., "EER of Fixed and Trainable Fusion Classifiers: A Theoretical Study with Application to Biometric Authentication Tasks", Multiple Classifier Systems, MCS 2005, Lecture Notes in Computer Science, vol. 3541, pp. 1-11.

Shi, Yue et al., "Cloudlet Mesh for Securing Mobile Clouds from Intrusions and Network Attacks", 2015 3rd IEEE International Conference on Mobile Cloud Computing, Services, and Engineering, pp. 109-118.

Taylor, Adrian et al., "Anomaly Detection in Automobile Control Network Data with Long Short-Term Memory Networks", IEEE 2016, pp. 130-139.

Taylor, Adrian "Anomaly-Based Detection of Malicious Activity in In-Vehicle Networks", Ph.D. Thesis, University of Ottawa 2017, 151 pages.

Wang, Alex Hai, "Don't Follow Me Spam Detection in Twitter", International Conference on Security and Cryptography, 2010, pp. 1-10.

Wang, Shuhao et al., "Session-Based Fraud Detection in Online E-Commerce Transactions Using Recurrent Neural Networks", 2017, 16 pages.

Zhang, Ke et al., "Automated IT System Failure Prediction: A Deep Learning Approach", IEEE 2016, pp. 1291-1300.

* cited by examiner

SYSTEM, METHOD, AND COMPUTER PROGRAM FOR PREDICTIVE AUTOSCALING FOR FASTER SEARCHES OF EVENT LOGS IN A CYBERSECURITY SYSTEM

BACKGROUND OF THE INVENTION

1. Field of the Invention

This invention relates generally to cybersecurity systems, and, more specifically, to predictive autoscaling for query searches on a database of event logs in a cybersecurity system.

2. Description of the Background Art

Cybersecurity systems monitor entity behavior in a network in order to detect cybersecurity threats. As entities interact with the network, various systems generate raw logs related to the entity behavior. For example, a cybersecurity system may obtain raw data logs related to a user's interactions with the IT infrastructure, such as user logon events, server access events, application access events, and data access events. Cybersecurity system will typically take these raw data logs and generate event logs from the raw data logs.

Cybersecurity analysts within an enterprise perform searches on the event logs to provide a better understanding of cybersecurity risks. Event log databases can be large, and search queries on the event log databases are often compute intensive processes. A query life cycle typically has the following stages:
  Query Authoring
  Query Parsing
  Autoscaling of Compute Resources (horizontal scaling)
  Query Execution
  Query Results
  Downscaling of Compute Resources Many cybersecurity systems store event logs in cloud-based databases, and scale compute resources for searches on demand. The scaling is performed after the query is submitted and parsed. Dynamically scaling compute resources on demand is more cost efficient than maintaining a high amount of compute resources at all times. Unfortunately, the time required to autoscale compute resources creates a delay in query execution, which results in slow queries. Therefore, there is demand for a solution that can autoscale without slowing down searches.

SUMMARY OF THE DISCLOSURE

The present disclosure describes a system, method, and computer program for predictive autoscaling for faster searches of event logs in a cybersecurity system. The system receives one or more signals indicative of a user's intent to perform a search for event logs in a cybersecurity database. Examples of the signals include a user clicking on a query builder window within a search interface for the event logs database or selecting a previous search. The system calculates an autoscale prediction score for a potential search based on the one or more signals. The system then makes an autoscale decision based on the autoscale prediction score. These steps are all performed prior to a user submitting a search query. In other words, the system makes an autoscale decision based on the likelihood that a user will submit a search. This way, if and when the user does submit a search, the computational resources for the search are available and there is no delay associated with provisioning additional compute resources.

In a preferred embodiment, the system receives signals from a plurality of different sources that collectively indicate not only the user's intent to perform a search, but also indicate how computationally intensive the search is likely to be and the currently available computational resources. For example, a signal indicating that a user has selected a query time domain within the search user interface provides an indication of the size of the search domain and hence the amount of computational resources required.

DETAILED DESCRIPTION OF THE PREFERRED EMBODIMENTS

The present disclosure describes a system, method, and computer program for predictive autoscaling for faster searches of event logs in a cybersecurity system. The methods disclosed herein are performed by a computer system ("the system"), such as cybersecurity system that detects cybersecurity threats in a network.

Figure 1:
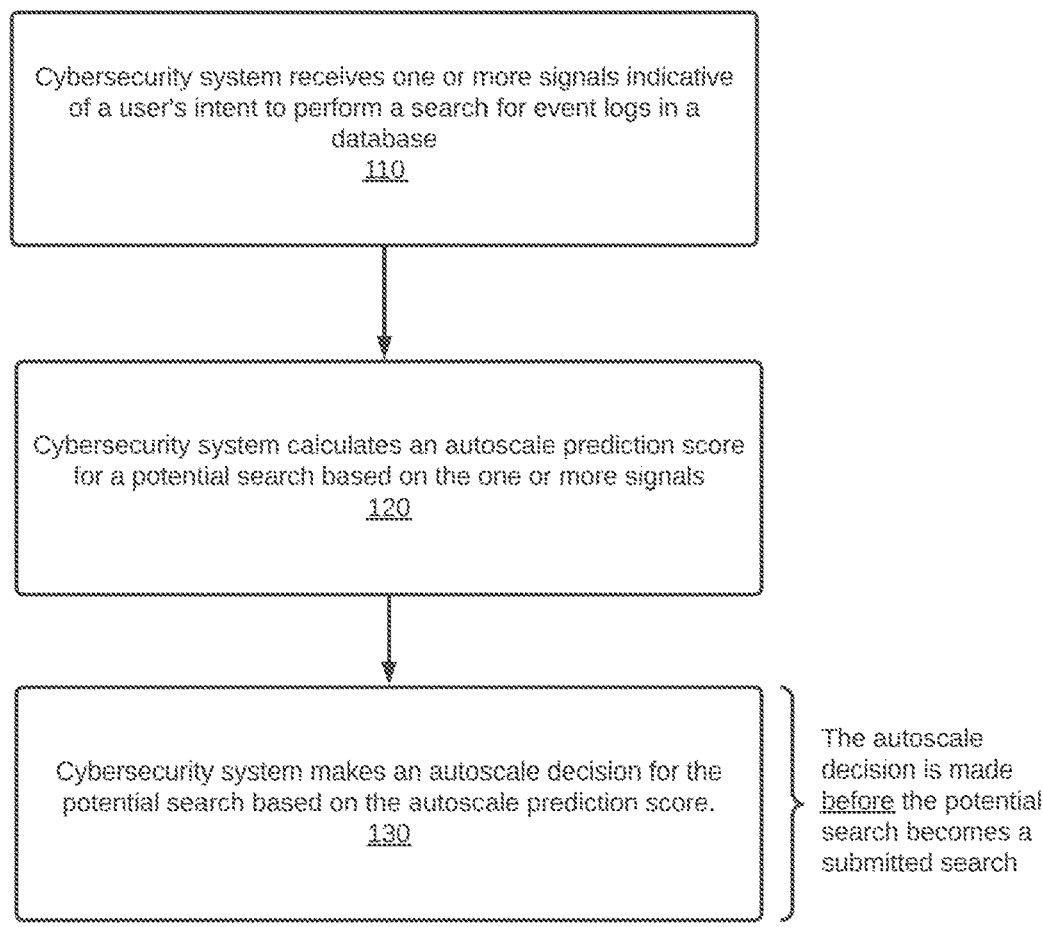
FIG. 1 is a flowchart that illustrate method for predictive autoscaling for event log searches in accordance with one embodiment.

FIG. 1 illustrates a method for predictive autoscaling for event log searches in accordance with one embodiment. The system receives one or more signals indicative of a user's intent to perform a search for event logs in a cybersecurity database (step 110). Examples of the signals include a user clicking on a query builder window within a search interface for the event logs database or selecting a previous search. The system calculates an autoscale prediction score for a potential search based on the one or more signals (step 120). The system then makes an autoscale decision based on the autoscale prediction score (step 130). These steps are all performed prior to a user submitting a search query. In other words, the system makes an autoscale decision based on the likelihood that a user will submit an event log search. This way, if and when the user does submit a search, the computational resources for the search are available, and there is no delay associated with provisioning additional compute resources.

Figure 2:
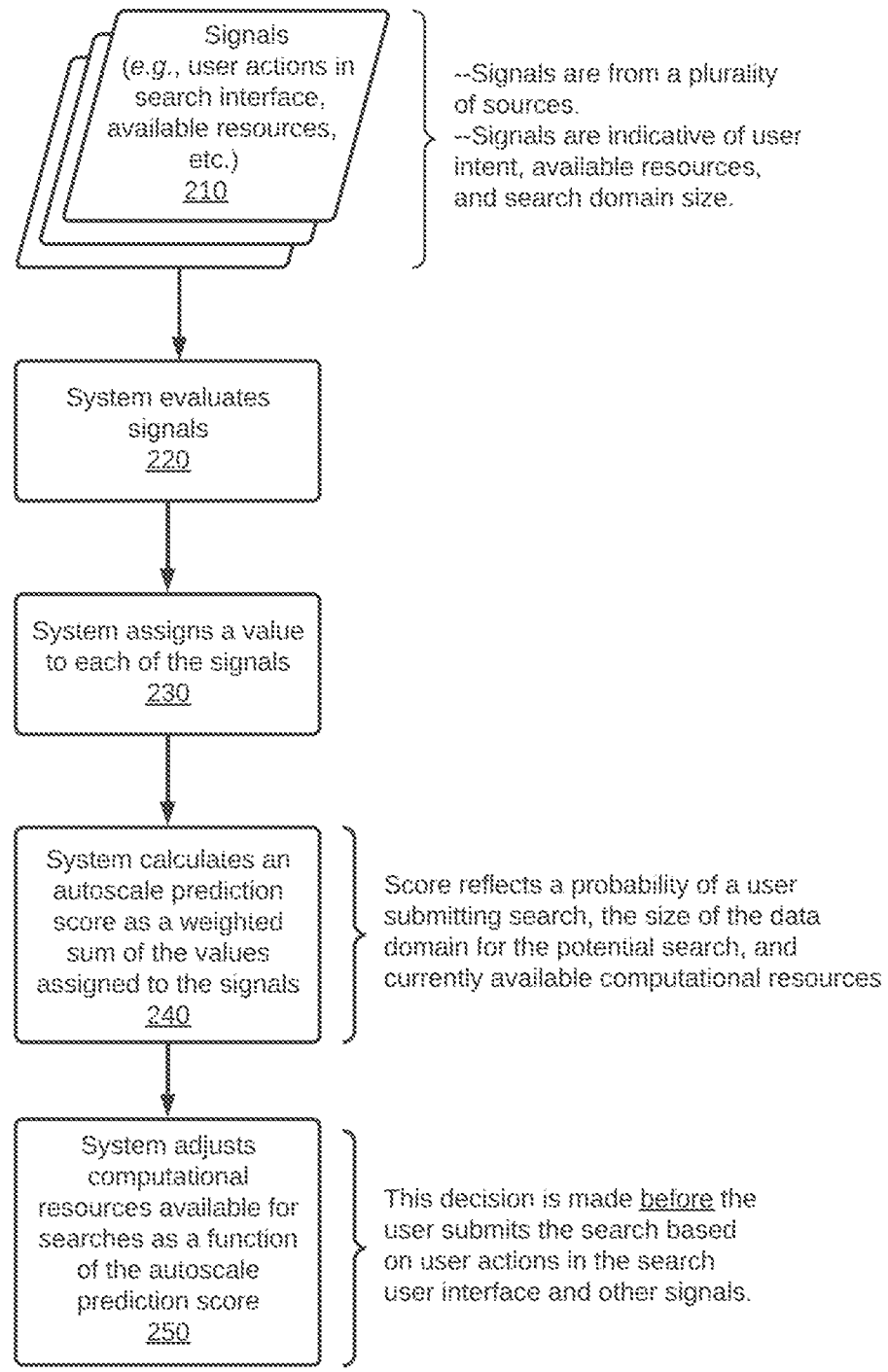
FIG. 2 is a flowchart that illustrates an example implementation of the method of FIG. 1.

FIG. 2 illustrates an example implementation of the method of FIG. 1. The system receives signals from a plurality of sources that are collectively indicative of: (1) user intent to perform a search, (2) likely search domain size, and (3) currently available computational resources (step 210). The signals related to the user intent and to the search domain size include signals about a user's actions on a search user interface before the user submits a search. Examples of the signals are set forth below in Table 1.

The system evaluates the signals and assigns a value to each signal (steps 220-230). The table below lists examples of the signals received and the values which may be assigned to each signal:

TABLE 1

| | Signal | What the signal is indicative of | Example Range of Values |
|---|---|---|---|
| 1 | User is using a query builder on a search user interface (e.g., user clicks on a query bar). | User intent to search | 0 (no usage), 1 (usage) |
| 2 | User selects a query time window (e.g., time range selection) | User intent to search; Size of search domain (i.e., computational resources required for search) | 0 (no selection of a window), 0.1 (selection of a "small" window), 0.2 (selection of a "medium" window), and 0.3 (selection of a "large" window). Small, medium, and large are defined by time window ranges. |
| 3 | User selection of a recent query | User intent | 0 (no selection), 1 (selection) |
| 4 | Pattern of usage hours for the given user | User intent | 0 (current time is outside the user's peak search timeframe), 1 (current time is within the user's peak search timeframe) |
| 5 | Pattern of usage hours for the given customer entity | User intent | 0 (current time is outside the entity's peak usage window for searches), 1 (current time is within the entity's peak usage window for searches) |
| 6 | Adding indexed fields to the query builder | User intent to search and computational resources required | 0 (an index field is not yet included within the search criteria), 1 (an indexed field has been added to the search criteria) |
| 7 | Percentage of compute resources available | Available compute resources | 0.3 (no compute engines currently available), 0.2 (small amount of compute engines available), 0.1 (medium amount of compute engines available), 0 (large amount of compute engines available). Small, medium, and large values may be predefined in configuring the system. |
| 8 | Size of customer event log database | Size of search domain | 0.1 (small), 0.2 (medium), 0.3 (large). Small, medium, and large values are defined by data size ranges. |

The system calculates an autoscale prediction score as a weighted sum of the values assigned to the signals (step 240). The score reflects the probability of a user submitting a search, the size of the search domain, and currently available computational resources. The autoscale prediction score may be expressed mathematically as follows:

$$\text{Autoscale prediction score}(APS) = s1*w1 + s2*w2 + s3*w3 + s4*w4 + \ldots sN*wN,$$

Where N is the number of signals.

In one embodiment, the signal values and the weights are assigned such that the autoscale prediction score is in the range between 0 and 1. The example signal values in Table 1 are designed for a prediction score between 0 and 1.

The system adjusts computational resources available for searches as a function of the autoscale prediction score (step 250). The autoscale prediction score is used to decide whether to autoscale and the capacity desired. This may be expressed mathematically as followed:

If APS>threshold value, Autoscaler initiates autoscaling.
Capacity required=f(APS)
f(APS) translates the autoscale prediction score to the amount of compute resources to be provisioned by the Autoscaler.

Steps 210-250 are performed before a user submits a search.

Figure 3:
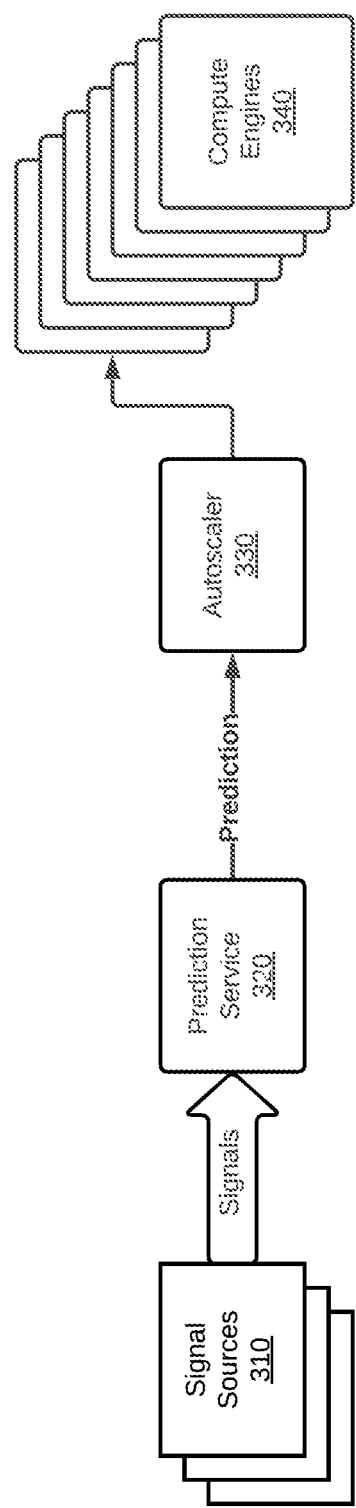
FIG. 3 is a block diagram that illustrates an example architecture for a system for predictive autoscaling.

FIG. 3 illustrates an example architecture of the system. A Prediction Service module 320 receives signals from a plurality of signal sources 310. The Prediction Service Module 320 calculates an autoscale prediction score in accordance with the methods described herein. The Autoscaler 330 provisions compute engines 340 for searching as a function of the autoscale prediction score.

The methods described with respect to FIGS. 1-3 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention.

The invention claimed is:

1. A non-transitory computer-readable medium comprising a computer program, that, when executed by a computer system, enables the computer system to perform the following method for predicting autoscaling requirements for query searches on a database of event logs in a cybersecurity system, the method comprising:
receiving a signal indicative of a user's intent to perform a search for event logs in the cybersecurity system;
calculating an autoscale prediction score for a potential search based on the signal; and
making an autoscale decision for the potential search based on the autoscale prediction score, wherein the autoscale decision for the potential search is made before the potential search becomes a submitted search for event logs in the cybersecurity system, and wherein the autoscale decision is to make computational resources available for the potential search, if and when the potential search becomes a submitted search.

2. The non-transitory computer-readable medium of claim 1, wherein:
a plurality of signals is received from a plurality of different signal sources for use in calculating the autoscale prediction score;
the plurality of signals includes the signal indicative of the user's intent to submit a query for event logs and a signal indicative of currently available computational resources for performing searches; and
the autoscale prediction score is calculated based on the plurality of signals.

3. The non-transitory computer-readable medium of claim 2, wherein the plurality of signals also includes a signal indicative of computational resources required for the potential search.

4. The non-transitory computer-readable medium of claim 3, wherein the signal indicative of the computational resources required for the potential search is one of the following: selection of a query time domain, size of event log database upon which the potential search would be performed, and addition of an indexed field to a query builder.

5. The non-transitory computer-readable medium of claim 2, wherein the signal indicative of the user's intent to perform the search is one of the following: usage of a query builder for the event log search, selection of a recent query, the user's past patterns of searches, selection of a query time domain, and an addition of an indexed field to a query builder.

6. The non-transitory computer-readable medium of claim 2, wherein calculating the autoscale prediction score comprises:
 assigning a value to each of the plurality of signals; and
 calculating a weighted sum of the signal values.

7. The non-transitory computer-readable medium of claim 1, further comprising:
 receiving a new signal related to the potential search after the autoscale prediction score has been calculated for the potential search;
 recalculating the autoscale prediction score to factor in the new signal; and
 making a new autoscale decision based on the recalculated autoscale prediction score.

8. The non-transitory computer-readable medium of claim 1, wherein making an autoscale decision comprises adjusting computational resources available for the potential search.

9. The non-transitory computer-readable medium of claim 8, wherein computational resources are increased as a function of the autoscale prediction score.

10. A computer system for predicting autoscaling requirements for query searches on a database of event logs in a cybersecurity system, the system comprising:
 one or more processors;
 one or more memory units coupled to the one or more processors, wherein the one or more memory units store instructions that, when executed by the one or more processors, cause the system to perform the operations of:
  receiving a signal indicative of a user's intent to perform a search for event logs in the cybersecurity system;
  calculating an autoscale prediction score for a potential search based on the signal; and
  making an autoscale decision for the potential search based on the autoscale prediction score, wherein the autoscale decision for the potential search is made before the potential search becomes a submitted search for event logs in the cybersecurity system, and wherein the autoscale decision is to make computational resources available for the potential search, if and when the potential search becomes a submitted search.

11. The system of claim 10, wherein:
 a plurality of signals is received from a plurality of different signal sources for use in calculating the autoscale prediction score;
 the plurality of signals includes the signal indicative of the user's intent to submit a query for event logs and a signal indicative of currently available computational resources for performing searches; and
 the autoscale prediction score is calculated based on the plurality of signals.

12. The system of claim 11, wherein the plurality of signals also includes a signal indicative of computational resources required for the potential search.

13. The system of claim 12, wherein the signal indicative of the computational resources required for the potential search is one of the following: selection of a query time domain, size of event log database upon which the potential search would be performed, and addition of an indexed field to a query builder.

14. The system of claim 11, wherein the signal indicative of the user's intent to perform the search is one of the following: usage of a query builder for the event log search, selection of a recent query, the user's past patterns of searches, selection of a query time domain, and an addition of an indexed field to a query builder.

15. The system of claim 11, wherein calculating the autoscale prediction score comprises:
 assigning a value to each of the plurality of signals; and
 calculating a weighted sum of the signal values.

16. The system of claim 10, further comprising:
 receiving a new signal related to the potential search after the autoscale prediction score has been calculated for the potential search;
 recalculating the autoscale prediction score to factor in the new signal; and
 making a new autoscale decision based on the recalculated autoscale prediction score.

17. The system of claim 10, wherein making an autoscale decision comprises adjusting computational resources available for the potential search.

18. The system of claim 17, wherein computational resources are increased as a function of the autoscale prediction score.

19. A method, performed by a computer system, for predicting autoscaling requirements for query searches on a database of event logs in a cybersecurity system, the method comprising:
 receiving a signal indicative of a user's intent to perform a search for event logs in the cybersecurity system;
 calculating an autoscale prediction score for a potential search based on the signal; and
 making an autoscale decision for the potential search based on the autoscale prediction score, wherein the autoscale decision for the potential search is made before the potential search becomes a submitted search for event logs in the cybersecurity system, and wherein the autoscale decision is to make computational resources available for the potential search, if and when the potential search becomes a submitted search.

20. The method of claim 19, wherein:
 a plurality of signals is received from a plurality of different signal sources for use in calculating the autoscale prediction score;
 the plurality of signals includes the signal indicative of the user's intent to submit a query for event logs and a signal indicative of currently available computational resources for performing searches; and
 the autoscale prediction score is calculated based on the plurality of signals.

21. The method of claim 20, wherein the plurality of signals also includes a signal indicative of computational resources required for the potential search.

\* \* \* \* \*